United States Patent [19]

Wolf et al.

[11] Patent Number: 5,461,415
[45] Date of Patent: Oct. 24, 1995

[54] LOOK-AHEAD SCHEDULING TO SUPPORT VIDEO-ON-DEMAND APPLICATIONS

[75] Inventors: Joel L. Wolf, Katonah; Philip S. Yu, Chappaqua, both of N.Y.

[73] Assignee: International Business Machines Corporation, Armonk, N.Y.

[21] Appl. No.: 213,284

[22] Filed: Mar. 15, 1994

[51] Int. Cl.⁶ .................................................. H04N 7/16
[52] U.S. Cl. .................. 348/7; 348/12; 455/4.2; 370/71
[58] Field of Search ................ 348/7, 12; 455/4.2; 370/71, 73, 124; H04N 7/16

[56] References Cited

U.S. PATENT DOCUMENTS

| | | | |
|---|---|---|---|
| 4,569,026 | 2/1986 | Best | 364/521 |
| 4,630,108 | 12/1986 | Gomersall | 358/84 |
| 4,646,261 | 2/1987 | Ng | 364/900 |
| 4,724,491 | 2/1988 | Lambert | 358/310 |
| 4,746,994 | 5/1988 | Ettlinger | 360/13 |
| 4,761,691 | 8/1988 | Stearns | 358/311 |
| 4,816,904 | 3/1989 | McKenna et al. | 358/84 |
| 4,847,696 | 7/1989 | Matsumoto et al. | 358/335 |
| 4,947,244 | 8/1990 | Fenwick et al. | 358/86 |
| 4,949,187 | 8/1990 | Cohen | 348/10 |
| 4,977,455 | 12/1990 | Young | 358/142 |
| 5,003,384 | 3/1991 | Durden et al. | 358/84 |
| 5,019,905 | 5/1991 | Pshtissky et al. | 358/146 |
| 5,130,792 | 7/1992 | Tindell et al. | 348/13 |
| 5,168,353 | 12/1992 | Walker et al. | 358/86 |
| 5,172,413 | 12/1992 | Bradley et al. | 380/20 |
| 5,206,722 | 4/1993 | Kwan | 358/86 |
| 5,208,665 | 5/1993 | McCalley et al. | 358/86 |
| 5,245,429 | 9/1993 | Virginio et al. | 358/142 |
| 5,247,347 | 9/1993 | Litteral et al. | 358/85 |
| 5,339,315 | 8/1994 | Maeda et al. | 455/4.2 |
| 5,341,474 | 8/1994 | Gelman et al. | 395/200 |
| 5,357,276 | 10/1994 | Banker et al. | 348/7 |

OTHER PUBLICATIONS

Fleming, "ADSL: The on–ramp to the information highway", TELEPHONY, Jul. 12, 1993, pp. 20, 24–26.

*Primary Examiner*—James J. Groody
*Assistant Examiner*—Nina N. West
*Attorney, Agent, or Firm*—Richard M. Ludwin

[57] ABSTRACT

A system and method of supporting pause-resume in a video-on-demand service of a type which can accommodate multiple viewers sharing a common data stream is described. When a video server receives a performance request from one of the viewers for showing a particular video, it identifies and reserves a look-ahead stream. The look-ahead stream is another video stream which is scheduled to become available after a predetermined time period. When the video is commenced, a common data stream for the video is concurrently transmitted from the video server to reception equipment at the viewers' locations. Transmission of the common data stream causes the particular video to be performed on the viewers' reception equipment. When the video server receives a pause request and then a subsequent resume request from one of the viewers, it transmits the video via the look ahead stream instead of the common data stream.

18 Claims, 10 Drawing Sheets

BUFFER

☒ IN USE
▨ RESERVED
☐ AVAILABLE

| STREAM ID | ACTIVE | RESERVED | | LOOK-AHEAD | VIDEO ID |
|---|---|---|---|---|---|
| 1 | Y | | | 4 | A |
| 2 | | Y | 1 | 5 | |
| 3 | | Y | 1 | 5 | |
| 4 | Y | | | | B |
| 5 | Y | | | | C |
| 6 | | Y | 5 | | |
| 7 | | | | | |
| 8 | | | | | |
| 9 | | | | | |
| 10 | | | | | |

LOOK-AHEAD SCHEDULING TO SUPPORT VIDEO-ON-DEMAND APPLICATIONS

BACKGROUND OF THE INVENTION

1. Field of the Invention

The present invention relates to the support of on-demand pause-resume in a central video server.

2. Related Art

The feature of pause-resume is one of the most common operations in VCR. Recently, it has become increasingly popular to develop multimedia servers to support video-on-demand (VOD) applications. In a VOD environment, there are often hot videos which are requested by many viewers. The requirement that each viewer can independently pause the video at any instance and later resume the viewing has caused difficulties in batching of viewers on each showing.

In one conventional approach to support on-demand pause-resume, one video stream is provided for each viewer video request. For each multimedia server, there is a maximum number of video streams to the disks that can be supported. This upper limit will be referred to as $N_{MAX}$. Thus, the abovedescribed approach can only support $N_{MAX}$ viewers.

In another conventional approach to the pause-resume problem, video streams for "hot" (popular) movies are scheduled such that they commence at fairly close intervals. In response to receipt of a resume command from a viewer (after having received a pause) the server assigns to the viewer one of the video streams for the same movie which is scheduled to reach the proper resume point in the near future. One problem with such a system is that the viewer must wait until a stream reaches the proper resume point before the movie can be viewed from the point at which the viewer paused.

II. SUMMARY OF THE INVENTION

It is an object of the invention is to support pause and quick resume for a larger number of viewers than $N_{MAX}$.

In accordance with an embodiment of the present invention there is provided a system and method of supporting pause-resume in a video-on-demand service of a type which can accommodate multiple viewers sharing a common data stream. When a video server receives a performance request from one of the viewers for showing a particular video, it identifies and reserves a look-ahead stream. The look-ahead stream is another video stream which is scheduled to become available after a predetermined time period. When the video is commenced, a common data stream for the video is concurrently transmitted from the video server to reception equipment at the viewers' locations. Transmission of the common data stream causes the particular video to be performed on the viewers' reception equipment. When the video server receives a pause request and then a subsequent resume request from one of the viewers, it transmits the video via the look ahead stream instead of the common data stream.

In a preferred embodiment, "look-ahead" stream scheduling with "look-aside" buffering is used to support a larger number of viewers than $N_{MAX}$. This system avoids the need for backing each viewer by a real video stream capacity from the disk.

If a buffer to store t time units of showing is available, two viewers share the same video stream as long as another stream will become available within t time units. This eliminates the need for a real stream capacity at least for t units of time. Look-ahead scheduling backs up viewers with a future (look-ahead) stream which is currently being used for another showing so he can pause and resume at any time. Before the look-ahead stream becomes available, the pausing and resuming viewing are supported by the original stream through buffering of the missed content. If there is not enough buffer space to support look-ahead scheduling, a reserved stream is used.

A reserved stream is an otherwise unused stream capacity of the server. When a reserved stream is allocated, the useable stream capacity of the multimedia system is reduced by one. With a reserved stream, a viewer who is sharing a common video stream with other viewers can pause at any time. When the viewer resumes, the reserved stream becomes the viewers active stream to be viewed.

At the time when the video showing associated with a look-ahead stream completes, if another playing or reserved stream can be found which will be completed within t units of time, a new look-ahead stream can be designated and the completing look-ahead stream can be used to schedule other viewers. So a viewer may be supported by a sequence of different look-ahead streams during the showing.

Thus each viewer is supported by either the real stream showing the video, some look-ahead stream, or a reserved stream. Each real stream or reserved stream for a given showing can support one look-ahead stream of another showing. There is an additional level of complexity due to the fact that the viewer of a look-ahead stream may pause so that the actual finishing time can be uncertain. To get around this problem, a stream, once chosen as a look-ahead stream, is not allowed to pause. Instead, when the viewer pauses, the stream is buffered. Then, when the viewer resumes he views the video from the buffer. Once a viewer can get the remaining portion of the video from the buffer, there will be no further stream requirement for the video. The viewer's buffer contents are not released until the viewing is completed.

III. BRIEF DESCRIPTION OF THE DRAWINGS

Like reference numerals appearing in more than one drawing depict like elements.

IV. DETAILED DESCRIPTION OF A PREFERRED EMBODIMENT

Figure 1:
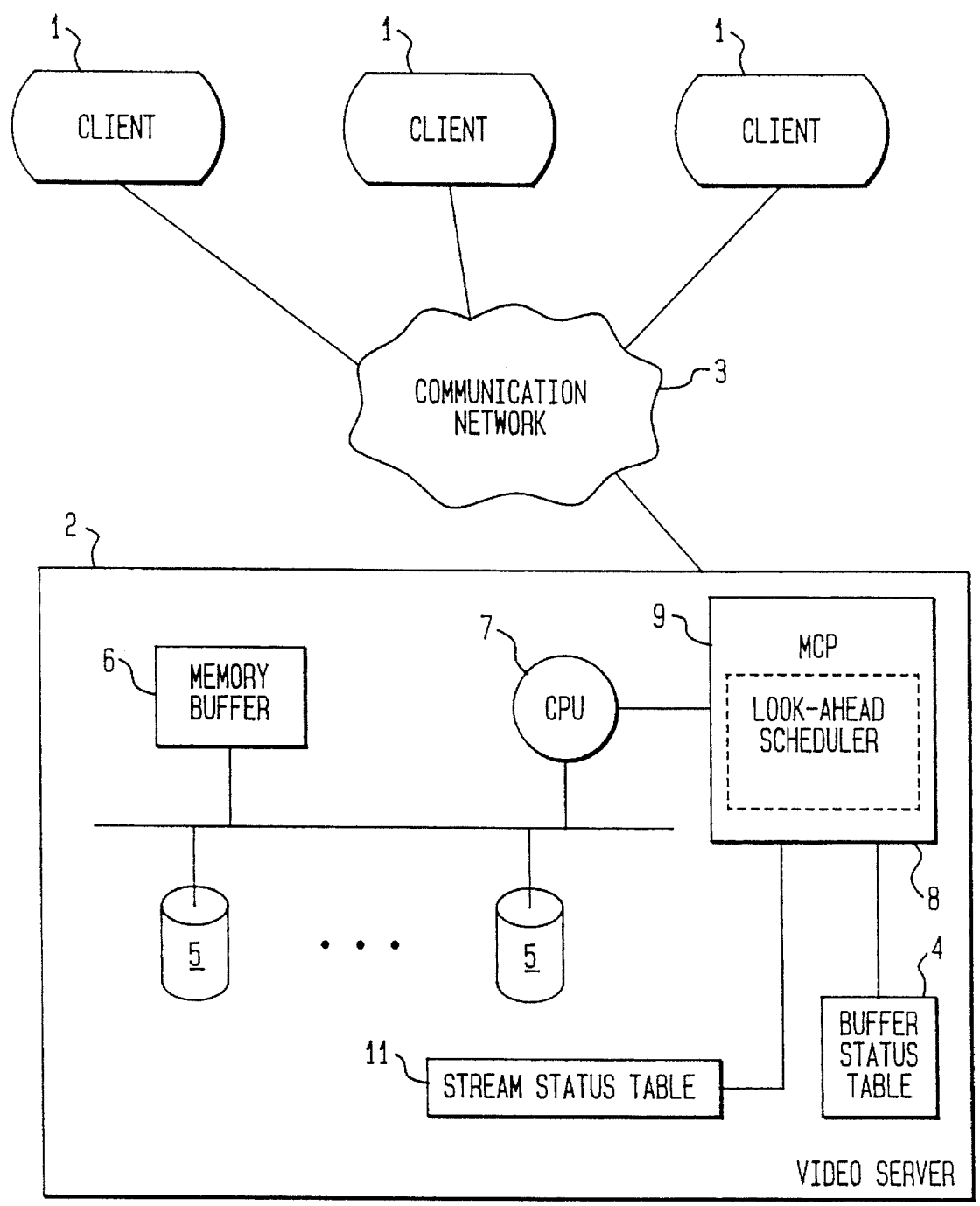
FIG. 1 is a block diagram of a multi-media server.

FIG. 1 is a block diagram of a video-on-demand system according to an embodiment of the present invention. In the following description, it is assumed that in a video-on-demand system clients 1 make requests from a video server 2 via a communication network 3. The movies (videos) are stored on disks 5. The server 2 includes memory buffers 6 for temporary storage of movies for handling short pause requests. The video server 2 also includes a processor 7 (cpu) which executes tasks under control of a main control program (mcp) 8. The video server can be embodied using any processor of sufficient performance for the number of video streams to be supported. For example, a small capacity video server could be embodied using an RISC System/6000 (RS/6000) system while a larger capacity server could be embodied using an ES/9000 system (both available from International Business Machines Corporation of Armonk, N.Y.). The communication network 3 can be, for example, a fiber optic network. The clients 1 are supported by a set-top box which enables them to send commands to the server 2 by way of the network 3.

In accordance with an embodiment of the present invention, one of the tasks is a look-ahead scheduler 9. The clients can make requests to start, stop, pause and resume a movie. The individual client requests are handled by a look-ahead scheduler 9. The look-ahead scheduler 9 attempts to conserve server resources by combining requests for the same movie that are close together in time while allowing each client to individually pause and resume.

Figures 2, 3:
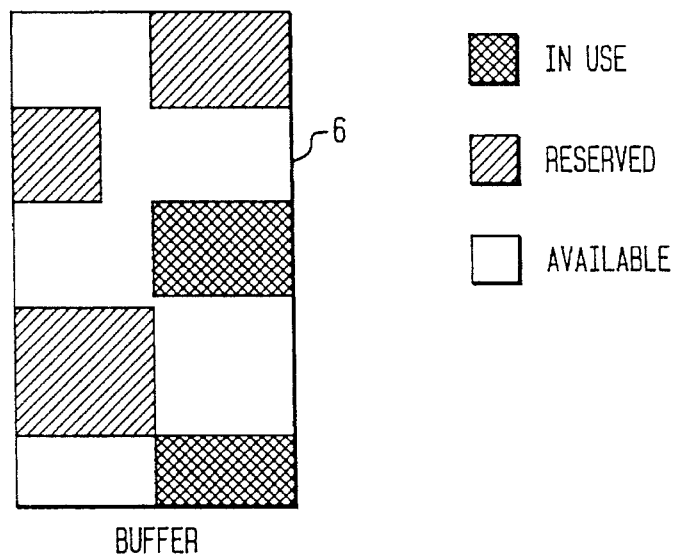
FIG. 2 is a block diagram of the (look-aside) buffer status.
FIG. 3 shows the stream status table.

The look-ahead scheduler 9 maintains a buffer status table 4 which tracks the use of the memory buffer 6. Referring now to FIG. 2, the (look-aside) memory buffer status will be described. Each buffer block can be in one of the three states: reserved, in-use, and available. As will be explained in detail later, during scheduling of videos, buffers can be put into a "reserved" state to support pause-resume. A "reserved" buffer changes to an "active" (in-use) state when a video stream is stored into it. The buffers which are neither "reserved" nor "active" are available for future allocation.

The look ahead scheduler also maintains a stream status table 11 which will now be described by reference to FIG. 3. The multimedia server can only support a fixed number of streams. A stream is considered to be "active", if it is supporting an actual showing of a video. A stream is considered "reserved" if it is reserved to support pause-resume of concurrent viewers of a showing. If a stream capacity is neither "active" nor "reserved", it is available for future showing.

FIG. 3 illustrates one way to do the bookkeeping. For each stream, the status of active, reserved or none is recorded. The absence of a recorded status (none) in both the active field 301 and reserved field 302 indicates that the steam is available. For a reserved stream, information on the corresponding active stream showing the video is also recorded in the "reserved" field 302. If a stream is designated as a look-ahead stream for a viewer in another showing being serviced by an active stream, information identifying that active stream is provided in the "look-ahead" field 304. The ID of the video showing on the active stream is recorded in a video ID field 306.

Figure 4:
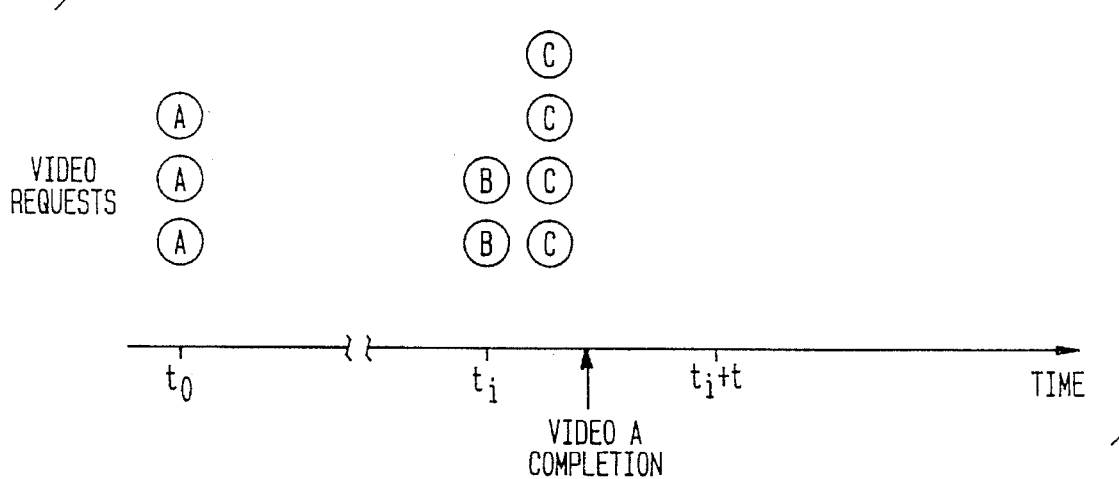
FIG. 4 shows a time line for a video request processing example.

For example, in FIG. 4, assume that three video requests for video A get scheduled at time $t_0$ and at that moment, there is no other active stream. Stream 1 is chosen as the active stream and streams 2 and 3 are designated as reserved streams for concurrent viewers on stream 1. (See the reserved field of streams 2 and 3 in FIG. 3.) At time $t_1$ two video requests for video B get scheduled. Assume that stream 1 is within t units of time to completion and there is sufficient buffer to support stream 1 as a look-ahead stream. We can choose stream 4 as the active stream and use stream 1 as the look-ahead stream. (See FIG. 3 on the look-ahead field 304 of stream 1.) Note that this second group of viewers (of video B) are not current viewers of stream 1. They merely use stream 1 (which is currently carrying video A) as a look-ahead stream to support pause-resume operations. Hence, viewers of stream 1 always means the first group of viewers which is currently viewing video A. If another four requests for video C are scheduled immediately afterwards, stream 5 can be used as the active stream and streams 2 and 3 as the look-ahead steams, assuming sufficient buffer. In addition, stream 6 is needed as a reserved stream. (See the look-ahead field of streams 2 and 3 and the reserved field 304 of stream 6 in FIG. 3.) FIG. 3 shows the stream status at this point, where there are 9 viewers consuming six stream capacities.

Assume that the multi-media system has a buffer for look-aside purposes of size B and a stream capacity of $N_{MAX}$. Let $N_{RESRV}$ be the number of reserved streams in the system and $N_{ACT}$ be the number of active streams showing the videos. Let $B_{RESRV}$ be the amount of look-aside buffer reserved and $B_{USE}$ be the amount of look-aside buffer currently in use. We further assume that each unit of time showing requires K bits of data.

Each time a video is selected for showing if $N_W$ customers are waiting for that video, the following procedure determines the largest number of viewers, C, that can be scheduled to allow for pause-resume. The procedure uses as many look-ahead streams as possible given the buffer constraint, and support the remaining viewers by reserved streams. To be more specific, 1. First the maximum number of additional look-ahead streams supportable given the current buffer usage is determined. This is referred to as $N_{LAHEAD}$ and is the minimum of the following two quantities, The number of video streams (not yet marked as look-ahead streams) to be completed in the next t units of time assuming no pausing, where t is a pre-specified operating parameter determined from the amount of buffer space available to support pause-resume. These are the potential look-ahead streams.

The number of additional look-ahead streams supportable by the current state of the buffer. Let us order the potential look-ahead streams based on their remaining time to completion, assuming no pausing. From a buffering view point, one would choose look-ahead streams on that order, i.e. choose look-ahead streams based on their completion times. Assuming that the ith potential look-ahead stream has a remaining time to completion of $t\alpha_i$, it will need a buffer of size $tK\alpha_i$ to be reserved if chosen. This buffer amount is needed to the save the video contents to completion if the current viewer of the potential look-ahead stream goes into a pause mode. (It is large enough to stream the rest of the showing into buffer, even in the worst case of immediate pausing.) If x look-ahead streams are chosen, an amount of $xtK\alpha$ additional reserved buffer will be needed to handle pausing of their associated viewers, where $\alpha t$ is the average remaining time to complete for the first x potential look-ahead streams, i.e:

$$\alpha = \left( \sum_{i=1}^{x} \alpha_i \right) / z$$

In addition, an amount of tK buffer space needs to be reserved to support short pausing of the new group of viewers (currently waiting to be scheduled) before the look-ahead streams become available. Hence, with x look-ahead streams chosen, the total amount of buffer needs to be reserved is $(tK+xt K\alpha)$. Thus, from the buffer view point the maximum supportable look ahead steams is the largest x value such that the buffer constraint is satisfied.

2. If this maximum number (x) is larger than $N_W-1$, all of these requesting viewers can be scheduled with one real stream for showing the video, and $N_W-1$ look-ahead streams. In this case, C equals to $N_W$.

3. Otherwise, the number of look-ahead streams used is $N_{LAHEAD}$. We need to obtain some streams capacities to put in reserved mode in order to schedule additional viewers not backed up by the look-ahead streams. The reserved streams obtainable must be smaller than the number of streams available, $N_{AVAIL}$, which is equal to $N_{MAX}-(N_{RESRV}+N_{ACT})$. If $N_W-N_{LAHEAD}-1$ streams or more are available to be put into reserved mode, all requested viewers can still be scheduled, i.e. C equals to $N_W$. Otherwise, C will be $N_{AVAIL}+N_{LAHEAD}$.

Let D be the number of look-ahead streams used. We will then set $B_{RESRV}$ equal to $tK+DK\alpha+B_{RESRV}$ and increase $N_{ACT}$ by one. Also if reserved streams are used, $N_{RESRV}$ is increased accordingly. Note that $B_{USE}$ will be incremented when the reserved buffers are actually in use to support the pause action. ($B_{RESRV}$ will be decremented for the same amount. ) This buffer will be released when not needed.

The buffer constraint in step 1, can be expressed as $\Theta(tK+xtK\alpha+B_{RESRV})<(B-B_{USE})$, where $\Theta$ (theta) is a tuning parameter. Setting $\Theta$ equals to one guarantees that the paused viewer will always be able to get back with no delay. In reality, not all viewers are going to pause at the same time, so $\Theta$ can be set at a lower value while still maintaining very low probability that the returned viewer would need to wait. Similarly, $N_{AVAIL}$ can be redefined to be $N_{MAX}-(\Theta'N_{RESRV}+N_{ACT})$, where $\Theta'$ is another tuning parameter. Note that in the case of a guaranteed no-delay resume, $\Theta'$ is set to one.

The look-ahead streams assigned can be delayed. For an additional $\Theta tK$ amount of buffer that can be reserved within the next t units of time, look-ahead streams can be allowed to be available t time units later. This rule can be applied repeatedly.

When a stream which is designated as a look-ahead stream is completed, if another look-ahead stream can be found to replace it (i.e. within t units of time to completion), new viewer requests can be scheduled using the newly available stream capacity. Otherwise it becomes a reserved stream. If a look-ahead stream will become available after t+w units of time, the reserved stream can be replaced by that look-ahead stream after w units of time. It can then be scheduled for other viewing.

Another optimization to improve the throughput is to allow a resuming stream to merge with a later-showing real stream. Still an appropriate look-ahead stream is required as before to support additional pausing in the future.

Figure 5:
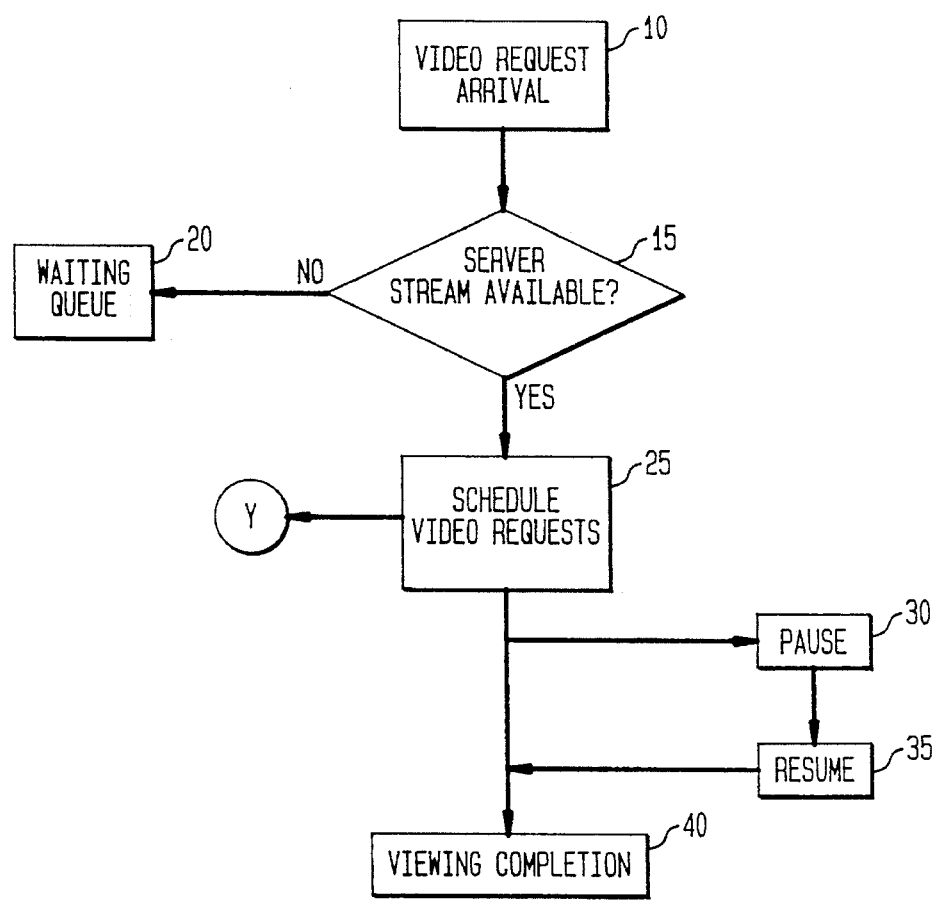
FIG. 5 is a flow diagram of an overall view of the look-ahead scheduler of FIG. 1, according to an embodiment of the present invention.

Referring now to FIG. 5 there is shown a flow diagram of an overall view of a scheduling method according to an embodiment of the present invention. The video request arrival is indicated in step 10. In step 15, the available stream capacity is checked. If there is no available stream capacity, step 20 is executed where the incoming video request is put into a request wait queue. Otherwise, if there is available stream capacity, steps 25–40 are executed. In step 25, the video request or requests is scheduled. The details of the scheduling procedure are given in FIG. 3. Once a video is scheduled, each viewer can pause and then resume at any time desired as indicated in step 30 for pausing operation and step 35 for resuming. The details of the bookkeeping to support the pause and resume operations are given in FIGS. 4 and 5, respectively. Step 40 represents the completion of the viewing by a requester. The details of the operation associated with the viewing completion are given in FIG. 6.

Figure 6A:
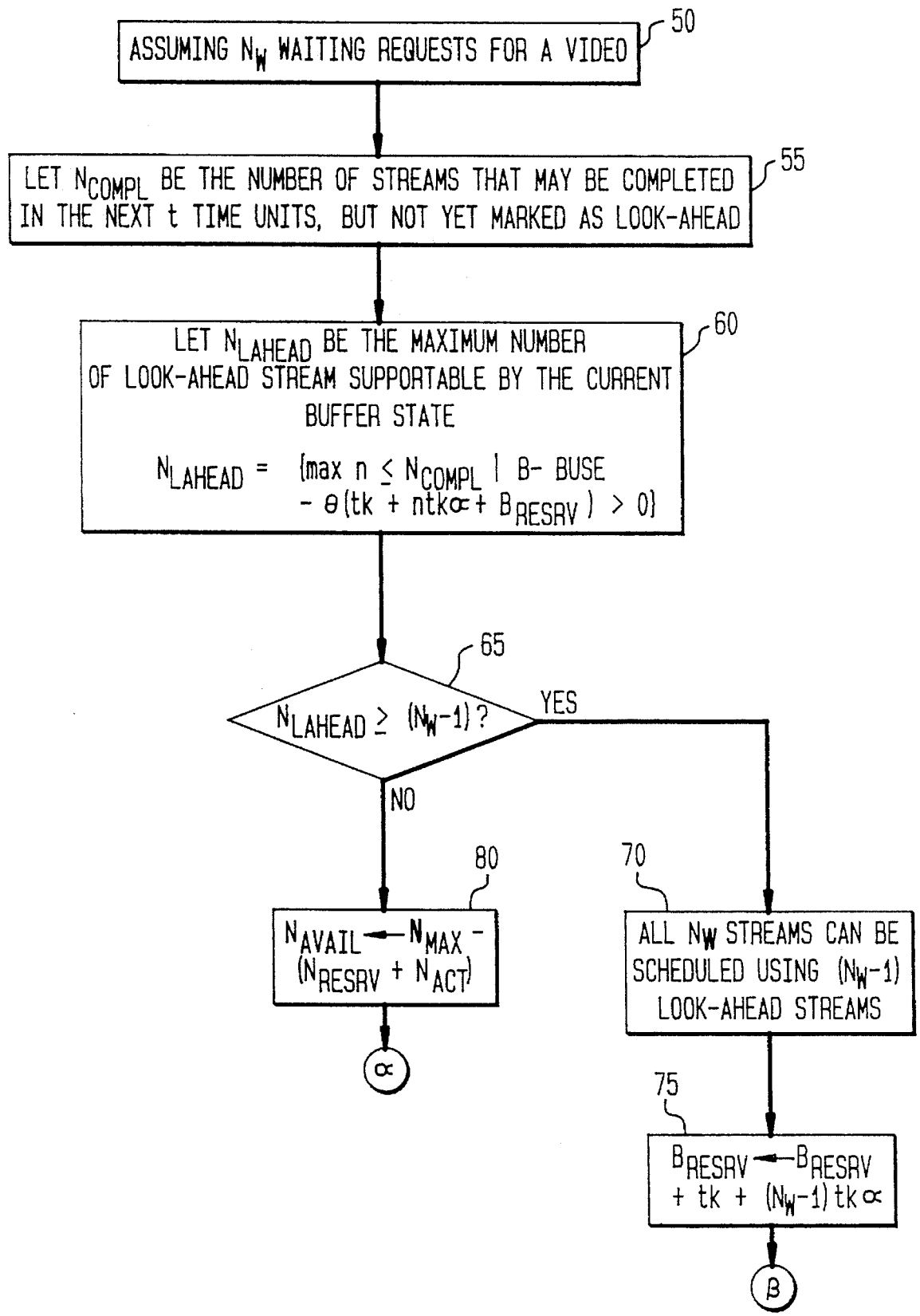
FIGS. 6a & 6b are a more detailed diagram of the look ahead scheduler task.
Figure 6B:
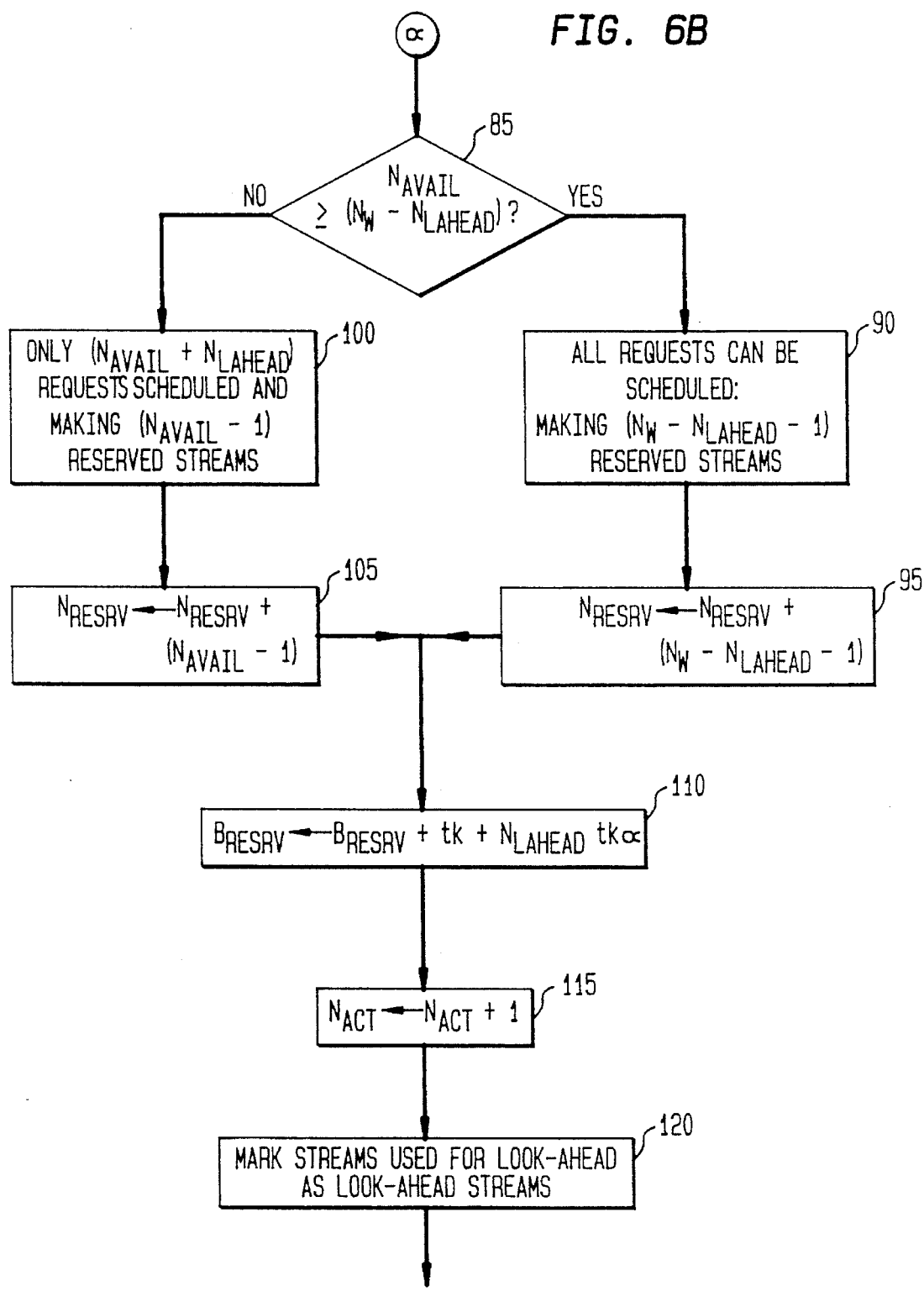

Referring now to FIGS. 6a and 6b the details of the scheduling operation are shown in more detail. In step 50, it is assumed that each time a movie is selected for showing, there are $N_W$ customers waiting for that movie. In step 55, the number of available streams that may be marked as look-ahead streams is determined. This is the number of streams, not yet marked as look-ahead streams, that can be completed in the next t units of time assuming no pausing requests. In step 60, the maximum number of look-ahead streams ($N_{LAHEAD}$) supportable for the given buffer size is determined.

In step 65, $N_{LAHEAD}$ is compared to $N_{W-1}$. If $N_{LAHEAD}$ is larger than $N_{W-1}$, all requesters can share one video stream, where another $N_W$ look-ahead streams are used to backup the pausing requirement, as indicated in step 70. In step 75, the number of buffer required to support the look-ahead scheduling is put into reserve mode.

Going back to step 65, if the maximum number of look-ahead streams supportable for the given buffer size is smaller than $N_{W-1}$, there are not enough look-ahead streams, hence some video stream capacity needs to be put into reserve mode. Step 80 determines the number of video streams that are currently available (i.e. neither showing nor reserved). In step 85, the number of available video streams is compared to the requirement to support outstanding viewers for the video. If there is enough available video streams, steps 90 and 95 are executed. Otherwise, steps 100 and 105 are executed. In steps 90 and 100, the appropriate number of requesters are scheduled for viewing the video showing, respectively. In steps 95 and 105, the appropriate number of video streams are put into reserved mode, respectively. In step 110, the amount of buffer space required to support the look-ahead scheduling is put into reserve mode. In steps 115 and 120, the bookkeeping on the scheduling is complete.

Figure 7:
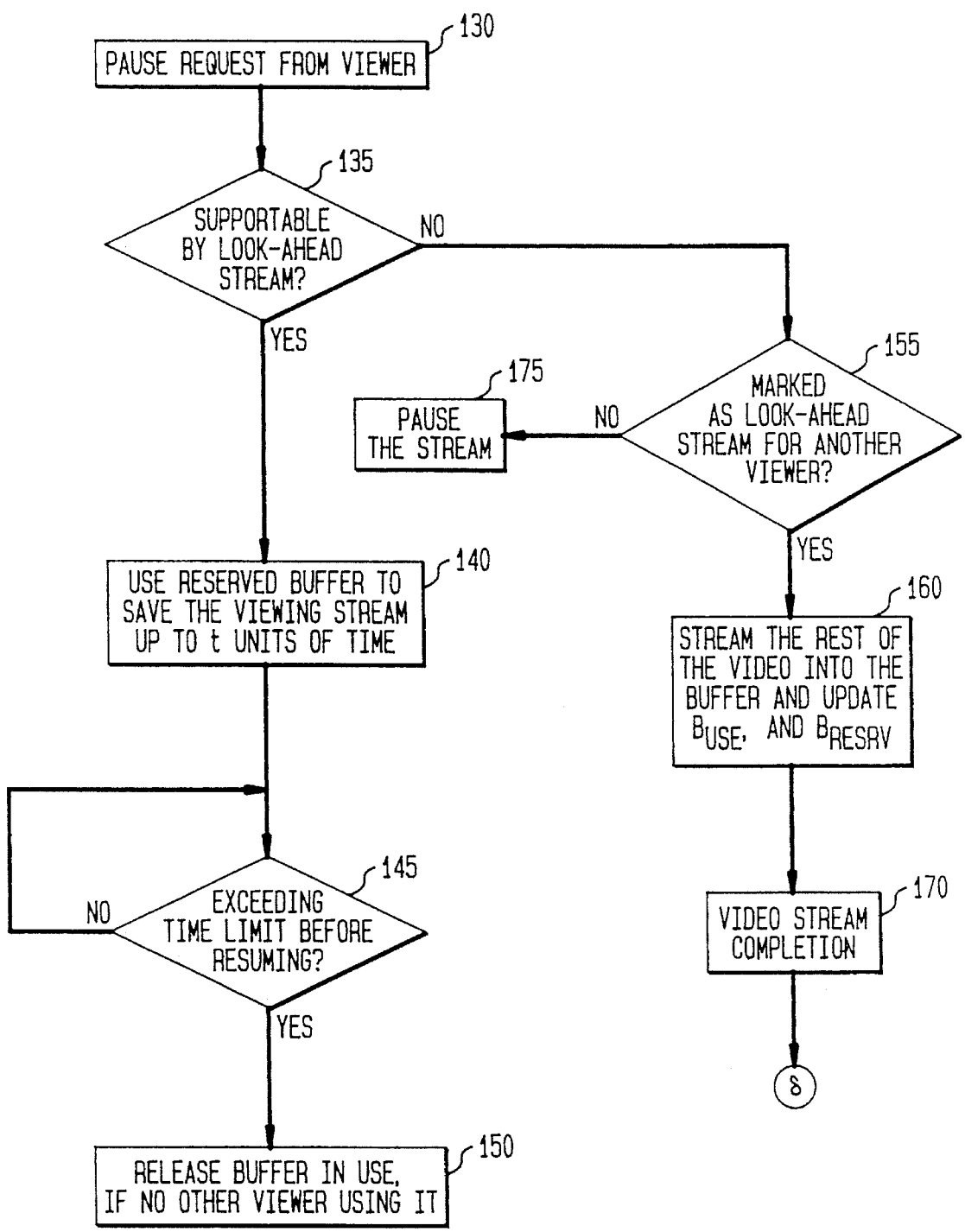
FIG. 7 is a more detailed flow diagram of the pause operation.

Referring now to FIG. 7 the details of the pausing operation are shown in more detail. Step 130 indicates the arrival of a pause request at the video server. In step 135, it is checked whether that viewer can be supported by a look-ahead stream. If the viewer can be supported by a look-ahead stream, as indicated by step 140, the reserved buffer is put into use to temporarily buffer the missing contents for the pausing viewer up to t units of time. In step 145, the pausing period is checked. If it exceeds the limit, in step 150 the buffer is released if no other viewers are using it.

If, in step 135, the viewer can not be supported by a look-ahead stream, in step 155 it is further checked if the supporting stream is marked as a look-ahead stream for another viewer. If this is true, in step 160, the video stream will continue streaming the video into the buffer until completion. The stream completion operation indicated in step 170 is explained in FIG. 9. In step 155, if the stream is not marked as look ahead, it can be stopped as indicated in step 175.

Figure 8:
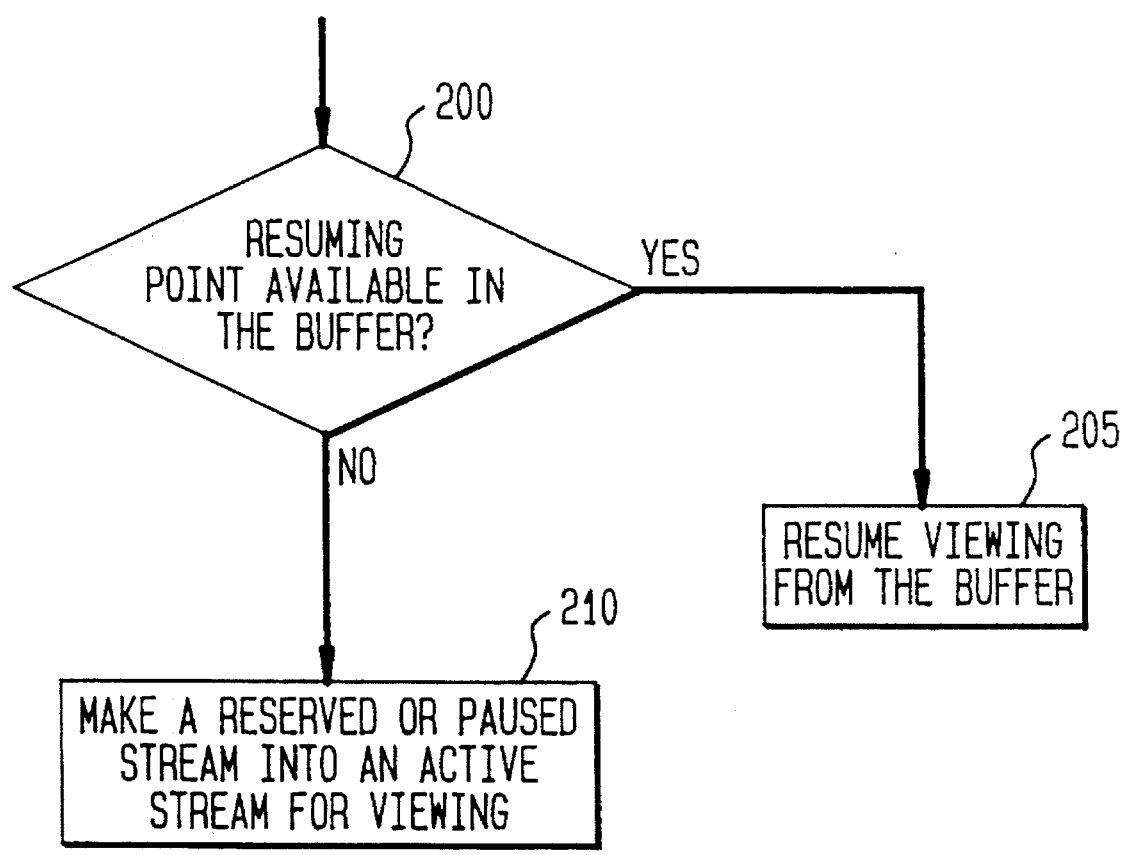
FIG. 8 is a more detailed flow diagram of the resume operation.

Referring now to FIG. 8 we examine the details of the resume operation. In step 200, it is checked whether the resuming point is available in the buffer. If so, as indicated in step 205, the viewer resumes the viewing from the buffer. Otherwise, as indicated in step 210, a reserved stream will be made into an actual showing stream to support the resumed viewer.

Figure 9:
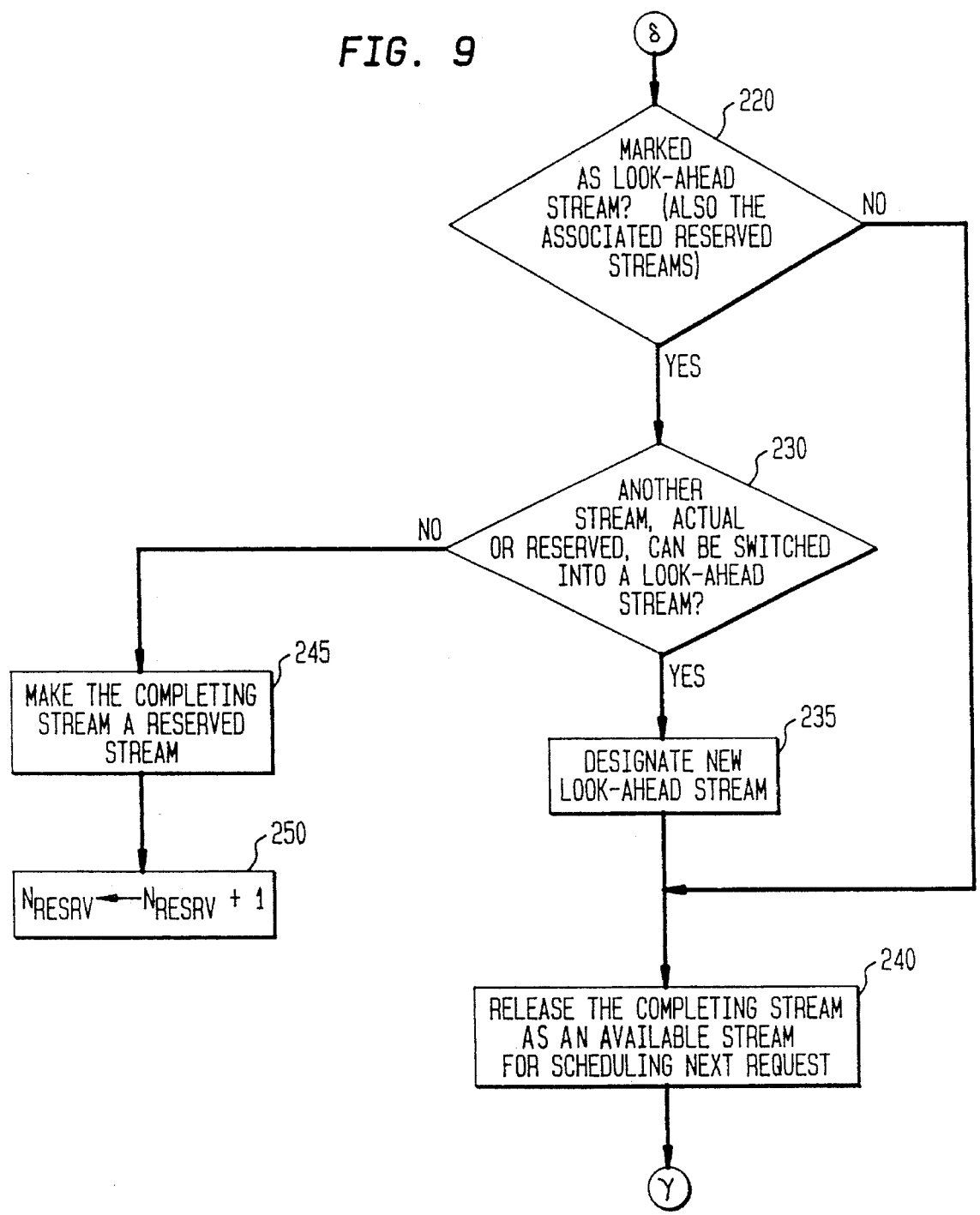
FIG. 9 is a more detailed flow diagram of the stream completion operation.

Referring now to FIG. 9 the details of the stream completion operation are shown. In step 220, when a video stream is completed, the scheduler determines whether this stream or any other associated reserved stream has been marked as a look-ahead stream. For each stream marked as a look-ahead stream, as indicated in step 230, the scheduler determines whether another stream can be identified and switched into a look-ahead stream. This is addressed in details in FIG. 8. If another stream can be switched to a look-ahead stream, steps 235 and 240 are executed. In step 235, that stream is designated as a new look-ahead stream to replace the completing video stream and in step 240, the completing stream is released as an available stream and the process of scheduling new video requests can be initiated if there are waiting video requests. (the stream scheduling process is described in FIG. 6.) In step 230, if no other stream can be switched into a look-ahead stream, steps 245 and 250 are executed. In step 245, the completing stream is made into a reserved stream, and in step 250, the appropriate bookkeeping is done.

Figure 10:
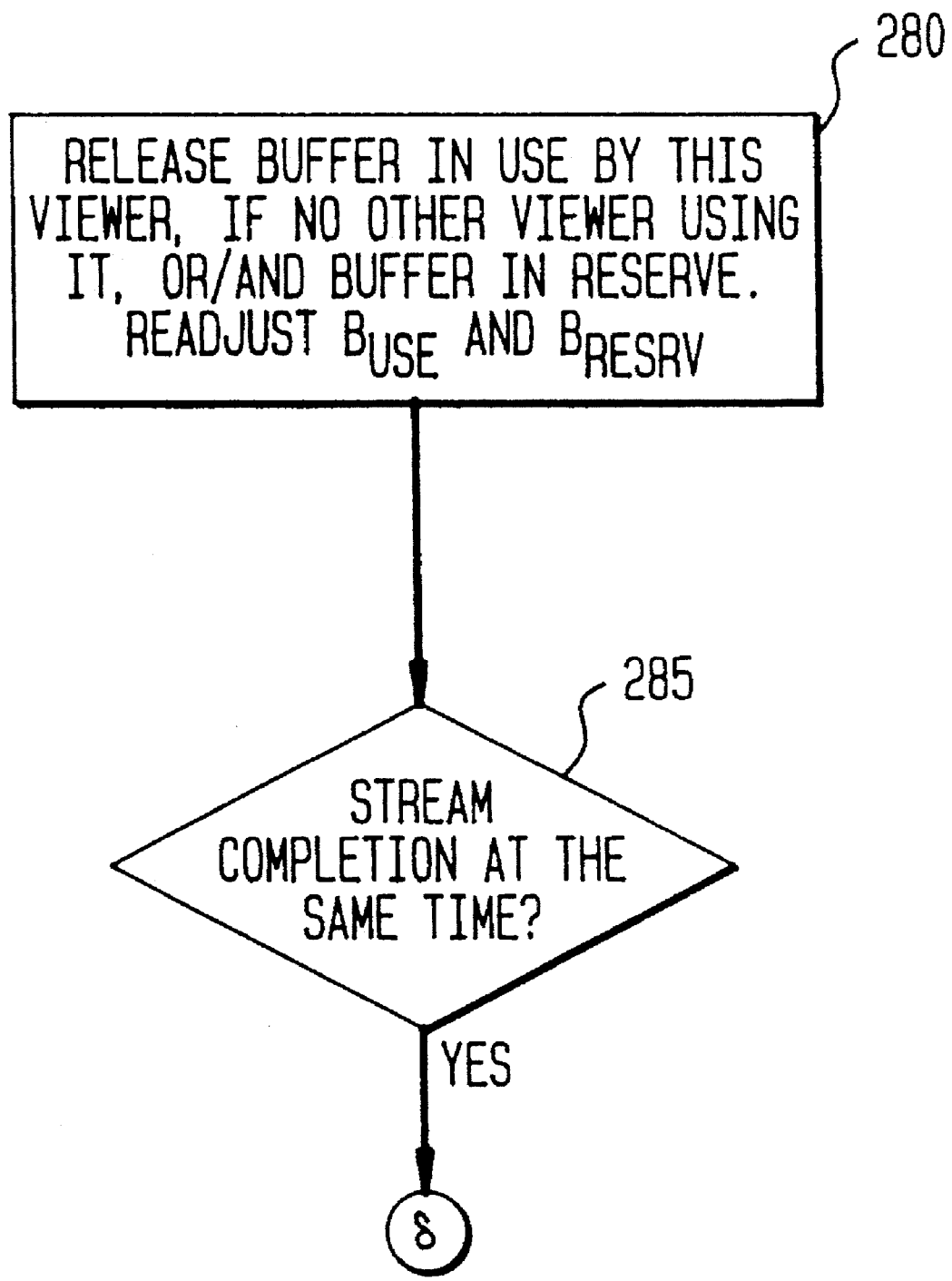
FIG. 10 is a more detailed flow diagram of the viewing completion operation.

Referring now to FIG. 10 we examine the details of the viewing completion operation. Note that viewing completion can be later than the stream completion, since during pausing, the video stream may continue and be saved in the buffer. In step 280, all buffer space in use or reserved for the completing viewer is released if not needed by another viewer. In step 285, simultaneous stream completion is checked. If so, the appropriate actions depicted in FIG. 6 are performed.

Figure 11:
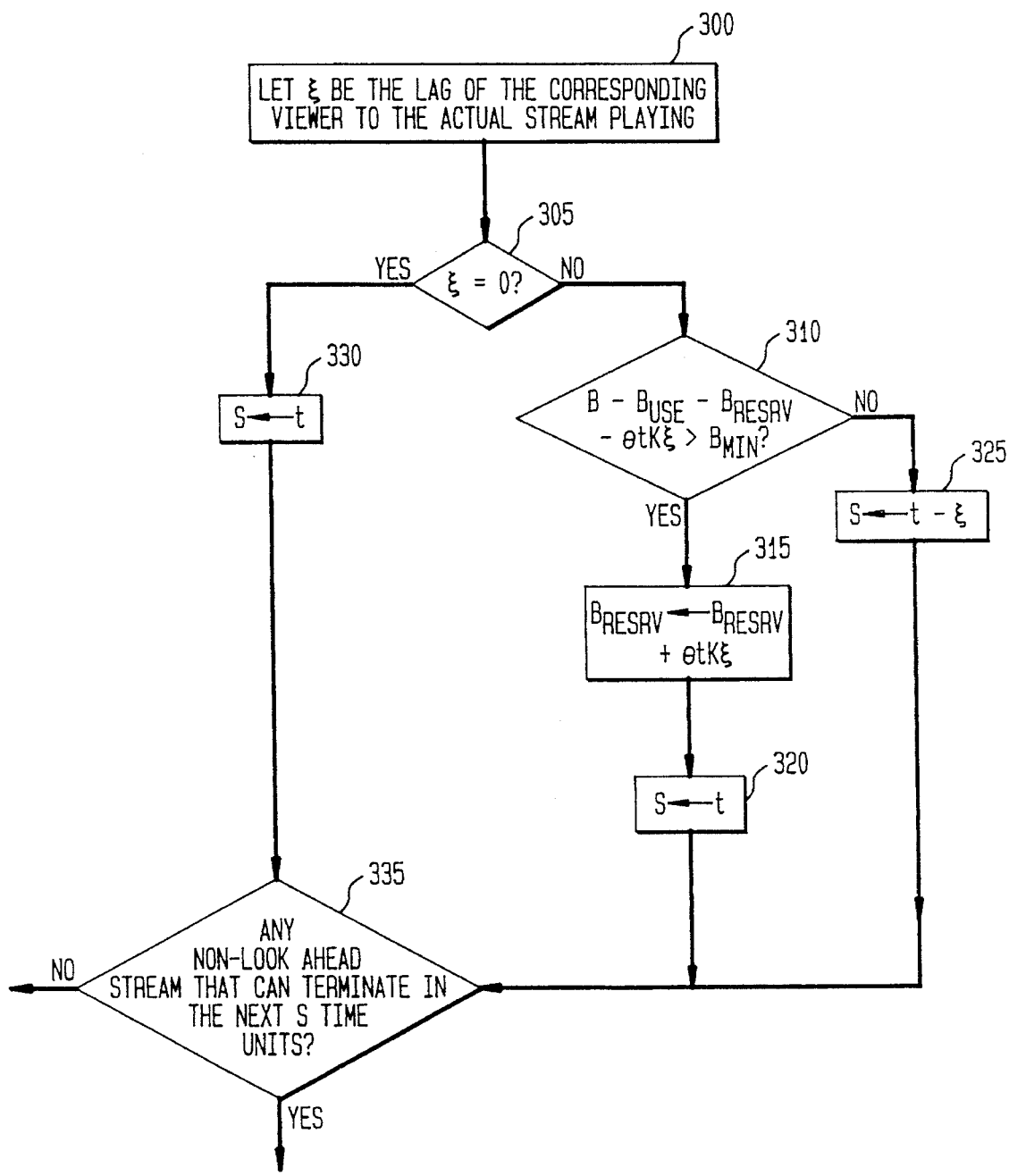
FIG. 11 is a more detailed flow diagram of the ahead stream switching process.

Finally referring now to FIG. 11 the details of the process of switching look-ahead stream will be described. FIG. 8 is a more detailed flow diagram of step 230 of FIG. 6. In step 300, let $\epsilon$ (epsilon) be the lag of the look-ahead stream to the actual showing stream. In step 305, the value of epsilon is examined. If it is not equal to zero, in step 310, the amount of available buffer is examined. If there is sufficient buffer (larger than $B_{MIN}$) after some additional allocation (of the amount of $\Theta t k \epsilon$), steps 315 and 320 are executed. In step 315, that additional buffer allocation is being made, and in step 320, the look ahead interval is set to t. In step 335, it is checked for whether any stream not yet marked as a look-ahead stream can terminate in the next t time units, assuming pausing does not occur. (If so, in step 235, the earliest terminating stream assuming no pausing is chosen as the look-ahead stream to switch over.)

Returning to step 310, if there is insufficient buffer (not larger than $B_{MIN}$) after some additional allocation (of the amount of $\Theta t k \epsilon$), no additional buffer is reserved and steps 325 and 335 are executed. In step 325, the look ahead interval is set to t–$\epsilon$.

Returning to step 305, if the value of $\epsilon$ is equal to zero, steps 330 and 335 are executed. In step 330, the look ahead interval is set to t.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of supporting pause-resume for a video-on-demand system of a type which can accommodate multiple viewers sharing a common data stream, comprising the steps of:

receiving a performance request from a viewer for showing a particular video;

in response to the performance request, identifying and reserving a look-ahead stream, the look-ahead stream being another video stream which is scheduled to terminate within a predetermined time period;

concurrently transmitting the common data stream from a video server to reception equipment at the multiple viewers' locations, transmission of the common data stream causing the particular video to be performed on the reception equipment;

receiving at the video server, a pause request and a subsequent resume request from the viewer; and, in response to the subsequent resume request, transmitting the particular video after the predetermined time period by way of the look-ahead stream instead of the common data stream wherein the particular video is commenced from a point at which the pause request was made.

2. A method of supporting pause-resume for a video-on-demand system of a type which can accommodate multiple viewers sharing a common data stream, comprising the steps of:

receiving a performance request from a viewer for showing a particular video;

in response to the performance request, identifying and reserving a look-ahead stream, the look ahead stream being another video stream which is scheduled to become available after a predetermined time period and and assigning the viewer a reserved stream which is released when the look-ahead stream is identified;

concurrently transmitting the common data stream from a video server to reception equipment at the multiple viewers' locations, transmission of the common data stream causing the particular video to be performed on the reception equipment;

receiving at the video server, a pause request and a subsequent resume request from the viewer; and, in response to the subsequent resume request, transmitting the particular video by way of the look-ahead stream instead of the common data stream.

3. The method of claim 2 wherein a different look-ahead stream is identified after a period of time has elapsed without the viewer initiating a pause request.

4. The method of claim 2 wherein the viewer is allocated sufficient buffer space to buffer the common video stream for the predetermined time period.

5. The method of claim 2 comprising the further step of buffering video data streams in response to pause requests from the viewers, whereby a number of viewers supportable by a given stream capacity is increased.

6. A system for supporting pause-resume for a video-on-demand system of a type which can accommodate multiple viewers sharing a common data stream, comprising:

receiving means for receiving a performance request from a viewer for showing a particular video;

identifying means for identifying and reserving a look-ahead stream, the look ahead stream being another video stream which is scheduled to terminate within a predetermined time period, wherein the identifying means is coupled to the receiving means and is responsive to the receipt of the performance request; and transmission means for concurrently transmitting the common data stream from a video server to reception equipment at the multiple viewers' locations, transmission of the common data stream causing the particular video to be performed on the reception equipment;

pause/resume means for receiving at the video server, a pause request and a subsequent resume request from the viewer; and substitution means for transmitting the particular video after the predetermined time period by way of the look-ahead stream instead of the common data stream wherein the particular video is commenced from a point at which the pause request was made, in response to the subsequent resume request.

7. The system of claim 6 wherein a different look ahead stream is identified after a period of time as elapsed without the viewer initiating a pause request.

8. A system for supporting pause-resume for a video-on-demand system of a type which can accommodate multiple viewers sharing a common data stream, comprising:

receiving means for receiving a performance request from a viewer for showing a particular video;

identifying means for identifying and reserving a look-ahead stream, which is another video stream which is scheduled to become available after a predetermined time period, and for assigning the viewer a reserved stream which is released when the look/ahead stream is identified, wherein the identifying means is coupled to the receiving means and is responsive to the receipt of the performance request;

transmission means for concurrently transmitting the common data stream from a video server to reception equipment at the multiple viewers' locations, transmission of the common data stream causing the particular video to be performed on the reception equipment;

pause/resume means for receiving at the video server, a pause request and a subsequent resume request from the viewer; and, substitution means for transmitting the particular video by way of the look-ahead stream instead of the common data stream, response to the subsequent resume request.

9. A system for supporting pause-resume for a video-on-demand system of a type which can accommodate multiple viewers sharing a common data stream, comprising:

receiving means for receiving a performance request from a viewer for showing a particular video;

identifying means for identifying and allocating a look-ahead stream, which is another video stream which is scheduled to become available after a predetermined time period, wherein the identifying means is coupled to the receiving means and is responsive to the receipt of the performance request;

transmission means for concurrently transmitting the common data stream from a video server to reception equipment at the multiple viewers' locations, transmission of the common data stream causing the particular video to be performed on the reception equipment;

pause/resume means for receiving at the video server, a pause request and a subsequent resume request from the viewer;

substitution means for transmitting the particular video by way of the look-ahead stream instead of the common data stream, in response to the subsequent resume request received in greater than the predetermined period of time from the subsequent pause request;

buffer means for buffering the common video stream for the predetermined period of time, in response to the pause request; and buffer access means for serving the viewer from the buffer means if the subsequent resume request is received within the predetermined time period, in response to the pause request.

10. A method of supporting pause-resume for a video-on-demand system of a type which can accommodate multiple viewers sharing a common data stream, comprising the steps of:

receiving a performance request from a viewer for showing particular video;

concurrently transmitting the common data stream from a video server to reception equipment at the multiple viewers' locations, transmission of the common data stream causing the particular video to be performed on the reception equipment;

receiving at the video server, a pause request and a subsequent resume request from the viewer;

in response to the subsequent resume request, performing the particular video for the viewer by commencing transmission of an alternative stream carrying the particular video other than the common data stream wherein the alternative stream is a reserved stream allocated from reserve capacity of the video server.

11. A method of supporting Pause-resume for a video-on-demand system of a type which can accommodate multiple viewers sharing a common data stream, comprising the steps of:

receiving a performance request from a viewer for showing a particular video;

concurrently transmitting the common data stream from a video server to reception equipment at the multiple viewers' locations, transmission of the common data stream causing the particular video to be performed on the reception equipment;

receiving at the video server, a pause request and a subsequent resume request from the viewer;

assigning buffer space to buffer the common video stream for a predetermined period of time, and in response to the subsequent resume request received within the predetermined period of time from the pause request, serving the viewer the particular video from the buffer space instead of by way of an alternative stream; and in response to the subsequent resume request received after the predetermined period of time from the pause request, performing the particular video for the viewer by commencing transmission of the alternative stream carrying the particular video other than the common data stream.

12. The method of claim 11, further comprising the step of:

in response to the performance request, identifying and reserving a look-ahead stream, which is another video stream which is scheduled to terminate within the predetermined period of time; and using the look-ahead stream as the alternative stream.

13. The method of claim 11, wherein the performing step further comprises commencing the particular video at a point from which the viewer made the pause request, in response to the subsequent resume request.

14. The method of claim 4 wherein the step of transmitting the particular video further comprises, serving the viewer the particular video from the buffer space instead of by way of the look-ahead stream if the subsequent resume request is received within the predetermined time period from the pause request.

15. The system of claim 8 wherein a different look-ahead stream is identified after a period of time has elapsed without the viewer initiating a pause request.

16. The system of claim 8 wherein the substitution means does not transmit the particular video by way of the look-ahead stream unless the subsequent resume request is received in greater than the predetermined time period from the subsequent pause request, the system further comprising:

buffer means for buffering the common video stream for the predetermined period of time, in response to the pause request; and buffer access means for serving the viewer from the buffer means if the subsequent resume request is received within the predetermined time period.

17. The system of claim 9 wherein a different look-ahead stream is identified after a period of time has elapsed without the viewer initiating the pause request.

18. The system of claim 9 wherein the viewer is assigned a reserved stream which is released when the look-ahead stream is identified.

* * * * *